United States Patent
Holmes et al.

(10) Patent No.: US 9,302,575 B2
(45) Date of Patent: Apr. 5, 2016

(54) POWERTRAIN FOR A VEHICLE AND A METHOD OF ASSEMBLING THE POWERTRAIN

(71) Applicant: GM GLOBAL TECHNOLOGY OPERATIONS LLC, Detroit, MI (US)

(72) Inventors: Alan G. Holmes, Clarkston, MI (US); Alexandru Rajala, Farmington Hills, MI (US); Chandra S. Namuduri, Troy, MI (US); Venkata Prasad Atluri, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 55 days.

(21) Appl. No.: 14/208,469

(22) Filed: Mar. 13, 2014

(65) Prior Publication Data
US 2015/0258883 A1    Sep. 17, 2015

(51) Int. Cl.
*B60K 6/485* (2007.10)
*B60K 6/40* (2007.10)

(52) U.S. Cl.
CPC . *B60K 6/40* (2013.01); *B60K 6/485* (2013.01); *Y10S 903/909* (2013.01); *Y10T 29/49233* (2015.01)

(58) Field of Classification Search
CPC .... B60K 6/40; B60K 6/485; Y10T 29/49233; F02N 15/02; F02N 15/021; F02N 15/04; F02N 11/00; F02N 11/006; F02N 11/003
See application file for complete search history.

(56) References Cited

U.S. PATENT DOCUMENTS

| | | | |
|---|---|---|---|
| 6,340,339 B1 * | 1/2002 | Tabata et al. | 475/5 |
| 7,114,585 B2 * | 10/2006 | Man et al. | 180/65.21 |
| 7,271,555 B1 * | 9/2007 | Ciccone | 318/139 |
| 7,819,211 B2 * | 10/2010 | Fukami et al. | 180/65.26 |
| 8,251,164 B2 * | 8/2012 | McGee | 180/65.21 |
| 8,545,367 B2 * | 10/2013 | Hartz et al. | 477/5 |
| 2002/0117860 A1 * | 8/2002 | Man et al. | 290/46 |
| 2003/0098188 A1 * | 5/2003 | Gu et al. | 180/65.3 |
| 2003/0102173 A1 * | 6/2003 | Koelle et al. | 180/65.2 |
| 2004/0026140 A1 * | 2/2004 | Suzuki et al. | 180/65.2 |
| 2004/0173393 A1 * | 9/2004 | Man et al. | 180/65.2 |
| 2012/0258838 A1 * | 10/2012 | Hartz et al. | 477/5 |
| 2013/0066492 A1 | 3/2013 | Holmes et al. | |
| 2014/0080664 A1 * | 3/2014 | Hartz et al. | 477/5 |
| 2015/0211465 A1 * | 7/2015 | Bradfield | |
| 2015/0258882 A1 * | 9/2015 | Holmes et al. | |

FOREIGN PATENT DOCUMENTS

DE    102004041156 A1    7/2005

* cited by examiner

*Primary Examiner* — Hau Phan
*Assistant Examiner* — Jacob Meyer
(74) *Attorney, Agent, or Firm* — Quinn Law Group, PLLC

(57) ABSTRACT

A powertrain for a vehicle and a method of assembling the powertrain are disclosed. An engine includes a crankshaft being rotatable about a longitudinal axis. A ring gear is attached to a first distal end of the crankshaft such that the ring gear and the crankshaft are rotatable in unison about the longitudinal axis. A starter mechanism is selectively operable to rotate the ring gear and the crankshaft to start the engine. A motor-generator includes an adapter selectively cooperating with the starter mechanism to dispose the motor-generator and the starter mechanism in alternative assembly configurations being a first assembly configuration and a second assembly configuration. The first assembly configuration is when the starter mechanism is coupleable to the adapter and the second assembly configuration is when the starter mechanism is spaced from the adapter to operate independently of the motor-generator.

20 Claims, 2 Drawing Sheets

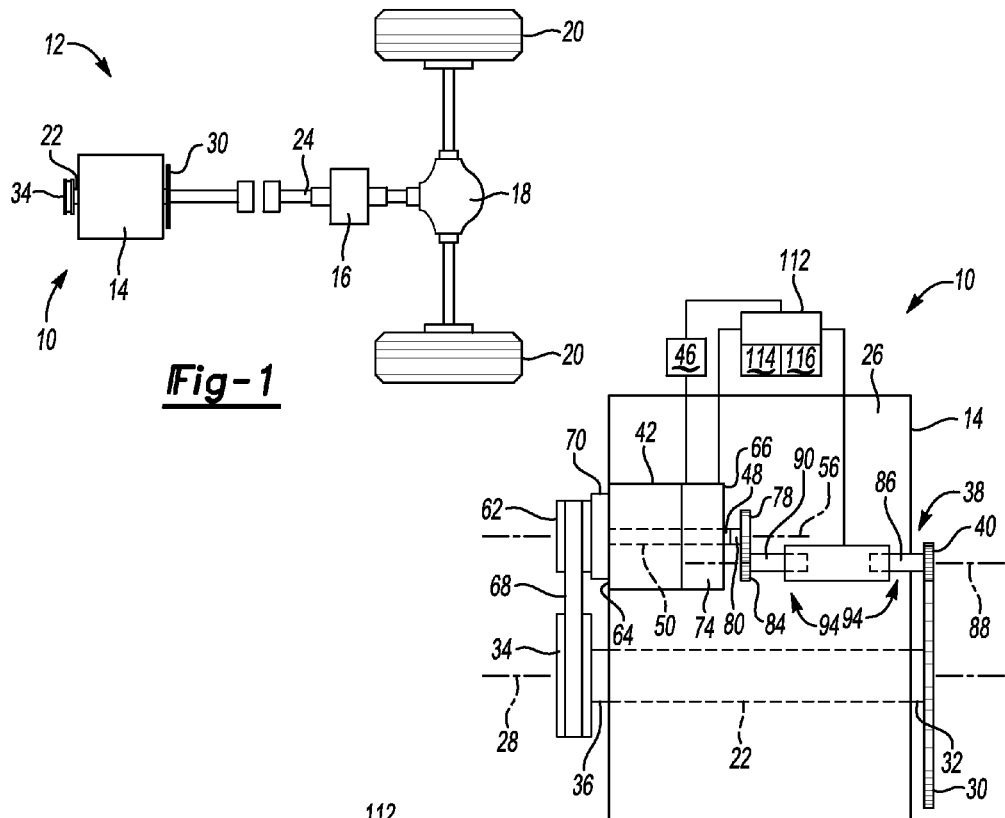
*Fig-1*
*Fig-2*
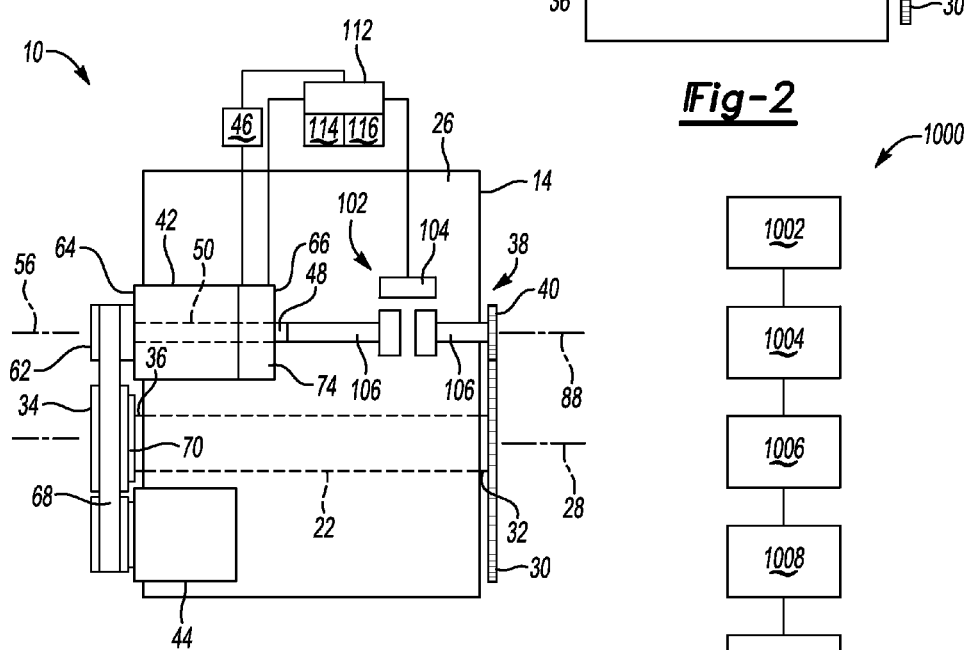
*Fig-3*
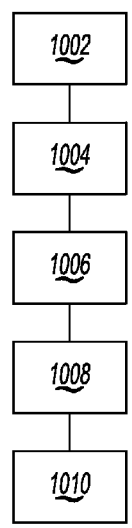
*Fig-8*

POWERTRAIN FOR A VEHICLE AND A METHOD OF ASSEMBLING THE POWERTRAIN

TECHNICAL FIELD

The present disclosure relates to a powertrain for a vehicle and a method of assembling the powertrain.

BACKGROUND

A vehicle can include an internal combustion engine coupled to a transmission and a final drive to rotate wheels that move the vehicle. To start the engine of a non-hybrid vehicle, a starter motor can be energized which causes a crankshaft of the engine to turn and start the engine.

A hybrid electric vehicle utilizes both an electric motor-generator and an internal combustion engine to offer reduced fuel consumption and emissions. One type of hybrid electric vehicle utilizes a belted-alternator-starter (BAS). The BAS utilizes a motor-generator coupled to a crankshaft of the engine usually by a belt and pulley system. The motor-generator can restart the engine when a brake is released at a stop light and the motor-generator can be rotated by the engine during regenerative braking. This type of hybrid vehicle utilizes a starter motor independent of the motor-generator to start the engine when the engine has been shut off for an extended period of time. The starter motor and the motor-generator operate separately, i.e., not coupleable to each other.

SUMMARY

The present disclosure provides a powertrain for a vehicle. The powertrain includes an engine. The engine includes a crankshaft being rotatable about a longitudinal axis. The powertrain also includes a ring gear attached to a first distal end of the crankshaft such that the ring gear and the crankshaft are rotatable in unison about the longitudinal axis. Furthermore, the powertrain includes a motor-generator, and a starter mechanism selectively operable to rotate the ring gear and the crankshaft to start the engine. The motor-generator includes an adapter selectively cooperating with the starter mechanism to dispose the motor-generator and the starter mechanism in alternative assembly configurations being a first assembly configuration and a second assembly configuration. The first assembly configuration is when the starter mechanism is coupleable to the adapter to selectively transfer torque from the motor-generator through the adapter and the starter mechanism to the crankshaft to start the engine, and the second assembly configuration is when the starter mechanism is spaced from the adapter to operate independently of the motor-generator such that the starter mechanism selectively transfers torque to the crankshaft to start the engine.

The present disclosure also provides another powertrain for a vehicle. The powertrain includes an engine. The engine includes a housing and a crankshaft at least partially disposed inside the housing. Furthermore, the crankshaft is rotatable about a longitudinal axis. The powertrain also includes a ring gear disposed outside of the housing and attached to a first distal end of the crankshaft such that the ring gear and the crankshaft are rotatable in unison about the longitudinal axis. Furthermore, the powertrain includes a motor-generator and a starter mechanism selectively operable to rotate the ring gear and the crankshaft to start the engine. The motor-generator includes an adapter selectively cooperating with the starter mechanism to dispose the motor-generator and the starter mechanism in alternative assembly configurations being a first assembly configuration and a second assembly configuration. The first assembly configuration being when the starter mechanism is coupleable to the adapter to selectively transfer torque from the motor-generator through the adapter and the starter mechanism to the crankshaft to start the engine and the second assembly configuration being when the starter mechanism is spaced from the adapter to operate independently of the motor-generator such that the starter mechanism selectively transfers torque to the crankshaft to start the engine.

The present disclosure further provides a method of assembling a powertrain. The method includes providing an engine including a crankshaft and attaching a ring gear to a first distal end of the crankshaft. The method also includes coupling a motor-generator to the engine, with the motor-generator including an adapter. Furthermore, the method includes providing a starter mechanism being selectively operable to rotate the ring gear and the crankshaft to start the engine. Additionally, the method includes assembling the motor-generator and the starter mechanism in a first assembly configuration when the starter mechanism is coupleable to the adapter to selectively transfer torque from the motor-generator through the adapter and the starter mechanism to the crankshaft to start the engine and a second assembly configuration when the starter mechanism is spaced from the adapter to operate independently of the motor-generator such that the starter mechanism selectively transfers torque to the crankshaft to start the engine.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 1 is a schematic illustration of a vehicle including a powertrain.

FIG. 2 is a schematic side view of the powertrain, with a motor-generator and a starter mechanism in a first assembly configuration.

FIG. 3 is a schematic side view of the powertrain, with the motor-generator and the starter mechanism being in another arrangement of the first assembly configuration.

FIG. 8 is a schematic flowchart of a method of assembling the powertrain.

DETAILED DESCRIPTION

Figure 4:
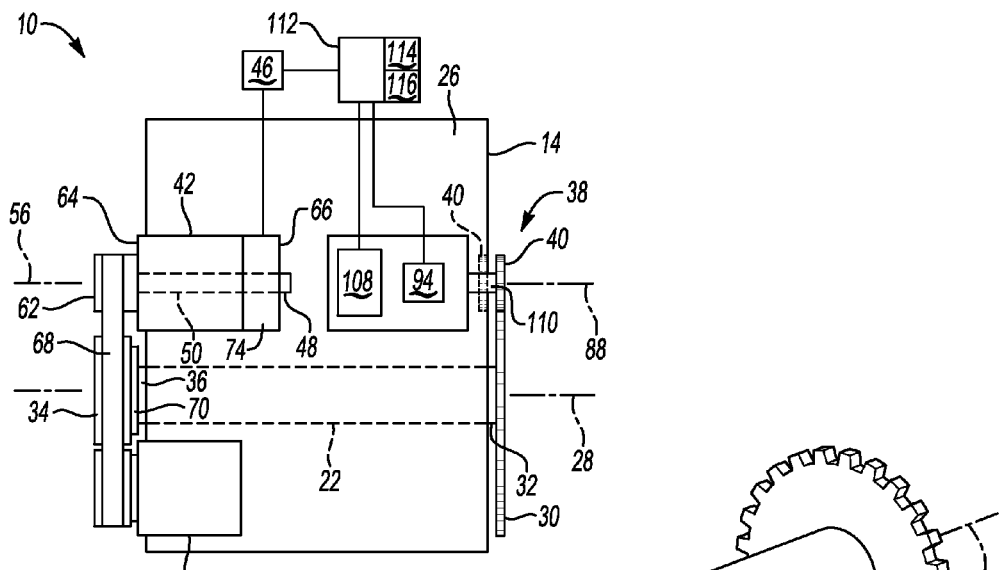
FIG. 4 is a schematic side view of the powertrain, with the motor-generator and the starter mechanism in a second assembly configuration.

Referring to the Figures, wherein like numerals indicate like or corresponding parts throughout the several views, a powertrain 10 for a vehicle 12 is generally shown in FIG. 1.

The vehicle 12 that can utilize the powertrain 10 can be an automotive vehicle, such as, a car, a truck, etc. It is to be appreciated that the vehicle 12 can alternatively be a non-automotive vehicle, such as, a farm vehicle, a marine vehicle, an aviation vehicle, etc. Furthermore, the vehicle 12 can be a hybrid vehicle utilizing the powertrain 10 disclosed herein. It is to be appreciated that the vehicle 12 can be any other suitable vehicle that can utilize the powertrain 10 disclosed herein.

Generally, as shown in FIG. 1, the powertrain 10 can include an engine 14, a transmission 16 and a final drive 18 coupleable to each other to rotate wheels 20 of the vehicle 12 to propel the vehicle 12. The engine 14 can include an output member or crankshaft 22 which is coupleable to an input member 24 of the transmission 16. The transmission 16 can include a gearing arrangement and one or more clutches through which torque is transferred from the output member 22 of the engine 14 to the input member 24 of the transmission 16, then to the final drive 18 and out to the wheels 20 to move the vehicle 12. The wheels 20 can be front wheels 20 or rear wheels 20 of the vehicle 12. The front and/or the rear wheels 20 can be powered by the powertrain 10.

The powertrain 10 includes the engine 14 as discussed above. For example, the engine 14 can be an internal combustion engine. In certain embodiments, as best shown in FIGS. 2-4, the engine 14 can include a housing 26 and the crankshaft 22 can be at least partially disposed inside the housing 26. Generally, the crankshaft 22 is rotatable about a longitudinal axis 28. In the Figures, the crankshaft 22 is shown schematically without any specific features for illustrative purposes only and it is to be appreciated that the crankshaft 22 can have various configurations to cooperate with other components of the engine 14. The engine 14 can also include a cylinder block, one or more connecting rods, pistons, valves, etc., which will not be discussed further. It is to be appreciated that the engine 14 can be designed to operate on gasoline, diesel fuel, etc.

Continuing with FIGS. 2-4, the powertrain 10 also includes a ring gear 30 attached to a first distal end 32 of the crankshaft 22 such that the ring gear 30 and the crankshaft 22 are rotatable in unison about the longitudinal axis 28. In other words, the ring gear 30 and the crankshaft 22 are rotatable as a unit about the longitudinal axis 28. In certain embodiments, the ring gear 30 is disposed outside of the housing 26.

Additionally, the powertrain 10 can include a crankshaft pulley 34 coupleable to a second distal end 36 of the crankshaft 22 such that the crankshaft pulley 34 and the crankshaft 22 can be rotatable in unison about the longitudinal axis 28. Specifically, coupleable can include when the crankshaft pulley 34 is directly coupled to the crankshaft 22 or indirectly coupled to the crankshaft 22 by the operation of another mechanism, such as a clutch. In certain embodiments, the crankshaft pulley 34 is disposed outside of the housing 26. Generally, the first and second distal ends 32, 36 of the crankshaft 22 are spaced from each other along the longitudinal axis 28. Simply stated, the crankshaft pulley 34 and the ring gear 30 are located at opposite ends of the crankshaft 22. It is to be appreciated that one or more bearings can rotatably support the crankshaft 22.

Continuing with FIGS. 2-4, the powertrain 10 includes a starter mechanism 38 selectively operable to rotate the ring gear 30 and the crankshaft 22 to start the engine 14. Therefore, when the starter mechanism 38 is actuated, the crankshaft 22 is rotated to start the engine 14. Generally, the starter mechanism 38 can include a first starter gear 40 being engagable with the ring gear 30 to selectively rotate the ring gear 30 and the crankshaft 22 to start the engine 14. In certain embodiments, the first starter gear 40 can be movable into and out of engagement with the ring gear 30. In other embodiments, the first starter gear 40 remains in engagement with the ring gear 30. Therefore, the first starter gear 40 and the ring gear 30 can selectively mesh with each other or can remain meshed together.

Generally, the starter mechanism 38 can be coupled to the engine 14. In certain embodiments, the starter mechanism 38 is coupled to the outside of the housing 26 of the engine 14 and/or supported by any suitable component adjacent to the engine 14. For example, the starter mechanism 38 can be supported by any suitable methods, such as fasteners, brackets, braces, etc.

Additionally, the powertrain 10 includes a motor-generator 42 (see FIGS. 2-4). The motor-generator 42 can operate as a motor or as a generator. The powertrain 10 can be referred to as a hybrid powertrain because the powertrain 10 utilizes the motor-generator 42 which can assist in reducing fuel consumption and emissions of the vehicle 12. For example, the motor-generator 42 can be utilized as a motor to run auxiliary devices 44, such as an air conditioning device, etc., or as a torque assist. As another example, the motor-generator 42 can be utilized as a generator to generate electricity or recharge an energy storage device 46, such as a battery. When the motor-generator 42 is generating electricity, the electricity can drive various auxiliary devices 44 of the vehicle 12, such as headlights, HVAC devices, auxiliary motors, entertainment system components, etc.

Generally, the motor-generator 42 can be coupled to the engine 14. In certain embodiments, the motor-generator 42 is coupled to the outside of the housing 26 of the engine 14 and/or supported by any suitable component adjacent to the engine 14. For example, the motor-generator 42 can be supported by any suitable methods, such as fasteners, brackets, braces, etc.

Figure 5:
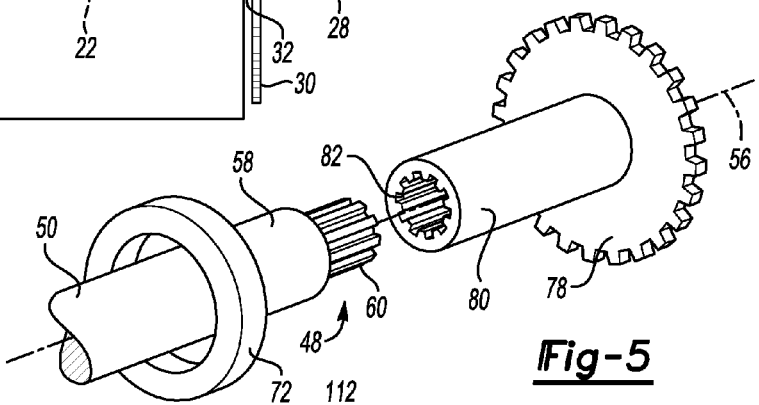
FIG. 5 is a schematic fragmentary exploded perspective view of a motor/generator shaft, an adapter and a first shaft having a first gear attached thereto.
Figure 6:
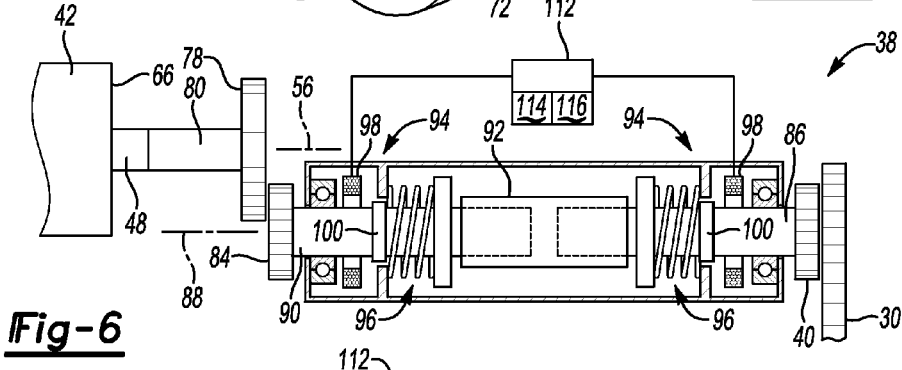
FIG. 6 is a schematic partial cross-sectional view of the starter mechanism and the motor-generator in the first assembly configuration corresponding to the configuration of FIG. 2.

As best shown in FIGS. 4-6, the motor-generator 42 including an adapter 48 selectively cooperating with the starter mechanism 38 to dispose the motor-generator 42 and the starter mechanism 38 in alternative assembly configurations being a first assembly configuration and a second assembly configuration. The first assembly configuration is when the starter mechanism 38 is coupleable to the adapter 48 to selectively transfer torque from the motor-generator 42 through the adapter 48 and the starter mechanism 38 to the crankshaft 22 to start the engine 14. The second assembly configuration is when the starter mechanism 38 is spaced from the adapter 48 to operate independently of the motor-generator 42 such that the starter mechanism 38 selectively transfers torque to the crankshaft 22 to start the engine 14. The adapter 48 can be disposed inside, partially inside or outside of the motor-generator 42.

The adapter 48 can cooperate with the starter mechanism 38 and the motor-generator 42 in certain configurations as discussed above. Therefore, the starter mechanism 38 is coupleable to the motor-generator 42 through the adapter 48 in certain configurations. Furthermore, the starter mechanism 38 and the motor-generator 42 are coupleable to each other through the adapter 48 and, for example, various shaft(s), clutch(es) and/or selective and/or continuous engagement of gear(s). Therefore, the motor-generator 42 and the starter mechanism 38 cooperate to start the engine 14 when in the first assembly configuration and the starter mechanism 38 only starts the engine 14 when in the second assembly configuration. The first assembly configuration is shown in FIGS. 2 and 3, while the second assembly configuration is shown in FIG. 4. Each of the assembly configurations are discussed in detail further below.

Referring to FIGS. 2-4, the motor-generator 42 can also include a motor/generator shaft 50 selectively rotatable about a first axis 56. Generally, the adapter 48 is coupled to the motor/generator shaft 50. Therefore, when in the first assembly configuration, the adapter 48 transfers rotational movement from the motor/generator shaft 50 to the first starter gear 40. The adapter 48 can be a separate part attached to the motor/generator shaft 50 or the adapter 48 can be integral with the motor/generator shaft 50 such that the adapter 48 and the motor/generator shaft 50 are formed of one piece. It is to be appreciated that the motor/generator shaft 50 can be split into more than one piece to operate with one or more clutches.

Figure 7:
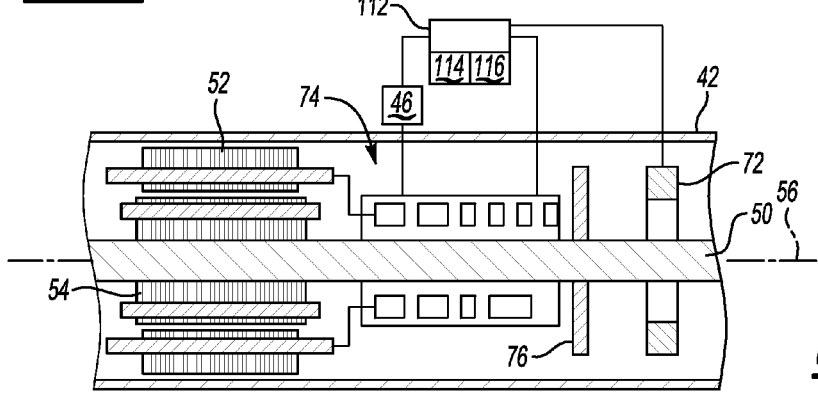
FIG. 7 is a schematic fragmentary cross-sectional view of the motor-generator.

Turning to FIG. 7, the motor-generator 42 can include a stator 52 and a rotor 54 spaced from the stator 52. The rotor 54 is attached to the motor/generator shaft 50 such that the rotor 54 and the motor/generator shaft 50 are rotatable in unison about the first axis 56 relative to the stator 52. Simply stated, the rotor 54 and the motor/generator shaft 50 can rotate as a unit about the first axis 56 while the stator 52 remains stationary. The components of the motor-generator 42 shown in FIG. 7 are compatible with all of the embodiments discussed herein.

Generally, the stator 52 is in electrical communication with the energy storage device 46. For example, when the motor-generator 42 is functioning as the motor, power stored in the energy storage device 46 can be supplied to the stator 52/rotor 54 to cause rotation of the rotor 54 and ultimately start the engine 14 in certain embodiments. As another example, when the motor-generator 42 is functioning as the generator, torque from the rotor 54 rotating about the first axis 56 is converted into electrical power which can be stored in the energy storage device 46 for later use.

As best shown in FIG. 5, in certain embodiments, the adapter 48 is disposed at a distal end 58 of the motor/generator shaft 50. The adapter 48 can include a first coupling portion 60 and the first coupling portion 60 can be splined. It is to be appreciated that the first coupling portion 60 can be any suitable configuration. For example, the first coupling portion 60 can be keyed, have one or more flat portions, be tapered, have internal splines or external splines, etc.

Referring back to FIGS. 2-4, the motor-generator 42 can also include a motor/generator pulley 62 coupleable to the motor/generator shaft 50. The motor/generator pulley 62 is disposed adjacent to a first end 64 of the motor-generator 42 and is rotatable about the first axis 56. Furthermore, the adapter 48 is disposed adjacent to a second end 66 of the motor-generator 42. Therefore, the adapter 48 and the motor/generator pulley 62 are spaced from each other. Simply stated, the adapter 48 and the motor/generator pulley 62 are disposed at opposite ends of the motor-generator 42. Specifically, the motor-generator 42 can include a housing having the first and second ends 64, 66, and thus, the adapter 48 and the motor/generator pulley 62 can be disposed at opposite ends of the housing of the motor-generator 42.

Coupleable can include when the motor/generator pulley 62 is directly coupled to the motor/generator shaft 50 or indirectly coupled to the motor/generator shaft 50 by the operation of another mechanism, such as a clutch. For certain operations, the motor/generator shaft 50 and the motor/generator pulley 62 can rotate in unison about the first axis 56. In other operations, the motor/generator shaft 50 and the motor/generator pulley 62 are not rotatable in unison, i.e., rotatable separately or one rotatable while the other remains stationary (does not rotate).

Continuing with FIGS. 2-4, the powertrain 10 can further include an endless rotatable device 68, i.e., a device having no ends, disposed about the crankshaft pulley 34 and the motor/generator pulley 62. Specifically, the endless rotatable device 68 is disposed about the crankshaft pulley 34 and the motor/generator pulley 62 to selectively transfer rotational movement between the crankshaft pulley 34 and the motor/generator pulley 62. In certain embodiments, the endless rotatable device 68 is a belt. The belt can be a ribbed belt, a flat belt or any other suitable configuration. Therefore, the motor-generator 42 can be coupled to the crankshaft 22 of the engine 14 by the endless rotatable device 68 and the pulleys 34, 62. In certain embodiments, the endless rotatable device 68 can be a chain instead of the belt and sprockets can be utilized with the chain instead of the pulleys 34, 62.

Optionally, the powertrain 10 can optionally include a first clutch 70 (see FIGS. 2-4) coupleable to one of the motor/generator pulley 62 and the crankshaft pulley 34. For illustrative purposes only, the first clutch 70 is shown coupled to the motor/generator pulley 62 in FIG. 2 and the first clutch 70 is shown coupled to the crankshaft pulley 34 in FIGS. 3 and 4. When the first clutch 70 is coupled to the motor/generator pulley 62, the first clutch 70 selectively disconnects rotation between the motor/generator pulley 62 and the motor/generator shaft 50. When the first clutch 70 is coupled to the crankshaft pulley 34, the first clutch 70 selectively disconnects rotation between the crankshaft pulley 34 and the crankshaft 22. When the first clutch 70 is coupleable to the motor/generator pulley 62, the motor/generator pulley 62 is selectively coupled to the motor/generator shaft 50 through operation of the first clutch 70. Similarly, when the first clutch 70 is coupleable to the crankshaft pulley 34, the crankshaft pulley 34 is selectively coupled to the crankshaft 22 through operation of the first clutch 70. It is to be appreciated that the first clutch 70 can include a plurality of plates, etc. Furthermore, the first clutch 70 can include a solenoid to selectively actuate the first clutch 70. It is to be appreciated that the first clutch 70 can be any suitable type of clutch.

Referring to FIGS. 5 and 7, the motor-generator 42 can further include a sensor 72 disposed about the motor/generator shaft 50 to detect a position of the motor/generator shaft 50 during rotation of the motor/generator shaft 50. The sensor 72 is spaced from and can surround the motor/generator shaft 50. Therefore, the motor/generator shaft 50 can rotate without engaging the sensor 72. In one non-limiting example, the sensor 72 can be a Hall Effect sensor.

Furthermore, as shown in FIGS. 2-4 and 7, the motor-generator 42 can include an electrical device 74. For example, the electrical device 74 can include an integrated power inverter. The integrated power inverter can convert direct current (DC) provided by the energy storage device 46 to alternating current (AC) to power the motor-generator 42 to function as the motor. Furthermore, the integrated power inverter can convert AC to DC to be stored in the energy storage device 46 when the motor-generator 42 functions as the generator. Additionally, the integrated power inverter can convert AC to DC to supply current to one or more devices. For example, the integrated power inverter can supply current to one or more auxiliary devices 44. Generally, the integrated power inverter can be in electrical communication with the stator 52 to operate the motor-generator 42 as the motor or as the generator. The motor-generator 42 can include other electrical devices, such as one or more sensors, controllers, fans 76 to cool electrical components, etc.

Regarding the first assembly configuration, the motor-generator 42 and the starter mechanism 38 cooperate with each other to start the engine 14. In other words, the motor-generator 42 provides the motor that rotates the first starter gear 40 to rotate the ring gear 30 and the crankshaft 22 to start the engine 14. Referring to FIGS. 2, 3 and 6, the motor-generator 42 and the starter mechanism 38 are coupleable to each other through the adapter 48 when in the first assembly configuration to selectively start the engine 14. The starter mechanism 38 and the motor-generator 42 are coupleable to each other through, for example, the adapter 48, various shaft(s), clutch(es) and/or selective and/or continuous engagement of gear(s) to start the engine 14 when the engine 14 has been shut off for any period of time, i.e., short or long. Therefore, coupleable can include selective coupling of various components and/or continuous coupling of various components. For example, continuing with FIGS. 2, 3 and 6, the motor-generator 42 and the starter mechanism 38 are selectively geared to each other through the adapter 48 when in the first assembly configuration to selectively transfer torque from the motor-generator 42 through the adapter 48 and the starter mechanism 38 to the crankshaft 22 to start the engine 14.

Specifically referring to FIGS. 2, 5 and 6, the powertrain 10 can include a first gear 78 coupled to the adapter 48, and more specifically, coupled to the first coupling portion 60 of the adapter 48 when in the first assembly configuration. Furthermore, the powertrain 10 can include a first shaft 80 having the first gear 78 attached to the first shaft 80. The first shaft 80 is attached to the first coupling portion 60 of the adapter 48 when in the first assembly configuration such that the first shaft 80, the first gear 78 and the motor/generator shaft 50 can be rotatable in unison about the first axis 56. It is to be appreciated that one or more bearings can rotatably support the motor/generator shaft 50.

Continuing with FIGS. 2, 5 and 6, the first shaft 80 can include a second coupling portion 82 engaging the first coupling portion 60 of the adapter 48 when in the first assembly configuration. Generally, the first gear 78 is spaced from the second coupling portion 82. Specifically, the first gear 78 and the second coupling portion 82 can be disposed on opposite ends of the first shaft 80. Therefore, the first gear 78 is coupled to the adapter 48 through the first shaft 80.

As best shown in FIGS. 2 and 6, the first starter gear 40 can engage the ring gear 30 to selectively rotate the ring gear 30 and the crankshaft 22 to start the engine 14. Furthermore, the starter mechanism 38 can include a second starter gear 84 coupleable to the first gear 78 when in the first assembly configuration. In this embodiment, the first starter gear 40 can be movable to selectively engage the ring gear 30 and the second starter gear 84 can be movable to selectively engage the first gear 78. Simply stated, the second starter gear 84 and the first gear 78 can selectively mesh with each other, and the first starter gear 40 and the ring gear 30 can selectively mesh with each other. When the first starter gear 40 engages the ring gear 30 and the second starter gear 84 engages the first gear 78, then the motor/generator shaft 50, the first shaft 80, the first gear 78, the first and second starter gears 40, 84 and the ring gear 30 rotate concurrently with each other to transfer torque from the motor/generator shaft 50 through the adapter 48, the first and second starter gears 40, 84 to the crankshaft 22 to start the engine 14. When the first starter gear 40 disengages the ring gear 30 and/or the second starter gear 84 disengages the first gear 78, then torque is not transferred to the crankshaft 22.

Additionally, the starter mechanism 38 of FIGS. 2 and 6, can include a first end shaft 86 having the first starter gear 40 attached thereto. In this embodiment, the first end shaft 86 and the first starter gear 40 are rotatable in unison about a second axis 88. In addition, in this embodiment, the first end shaft 86 and the first starter gear 40 are movable along the second axis 88 in unison. In other words, the first end shaft 86 and the first starter gear 40 are rotatable about and movable along the second axis 88 as a unit. In this embodiment, the motor/generator shaft 50 and the first end shaft 86 are offset from each other, i.e., the first and second axes 56, 88 are not coaxial. It is to be appreciated that one or more bearings can rotatably support the first shaft 80.

Continuing with the embodiments of FIGS. 2 and 6, the starter mechanism 38 can also include a second end shaft 90 having the second starter gear 84 attached thereto. In this embodiment, the second end shaft 90 and the second starter gear 84 are rotatable in unison about the second axis 88. Additionally, in this embodiment, the second end shaft 90 and the second starter gear 84 are movable along the second axis 88 in unison. In other words, the second end shaft 90 and the second starter gear 84 are rotatable about and movable along the second axis 88 as a unit.

The first end shaft 86 extends outwardly from one end of the starter mechanism 38 and the second end shaft 90 extends outwardly from another end of the starter mechanism 38. Therefore, the first starter gear 40 is disposed outside one end of the starter mechanism 38 and the second starter gear 84 is disposed outside another end of the starter mechanism 38. Simply stated, the first and second starter gears 40, 84 can be spaced from each other at opposite ends of the starter mechanism 38. Specifically, the starter mechanism 38 can include a housing having opposing ends, and thus, the first and second starter gears 40, 84 can be disposed at opposite ends of the housing of the starter mechanism 38.

The starter mechanism 38 can also include an intermediate shaft 92 (see FIG. 6) coupled to the first and second end shafts 86, 90 between the first and second starter gears 40, 84 such that the intermediate shaft 92 can rotatably couple the first and second end shafts 86, 90 together. In other words, the first and second end shafts 86, 90 remain in engagement with the intermediate shaft 92 when the first and second end shafts 86, 90 move back and forth along the second axis 88. As such, the intermediate shaft 92 transfers rotation from the second end shaft 90 to the first end shaft 86.

The intermediate shaft 92 can be any suitable configuration to allow the first and second end shafts 86, 90 to move along the second axis 88 while also rotatably coupling the first and second end shafts 86, 90 together. For example, the first and second end shafts 86, 90 can move along the second axis 88 inside the intermediate shaft 92, and the intermediate shaft 92 and the first and second end shafts 86, 90 can be splined or be any other suitable configuration to cooperate with each other. The first and second starter gears 40, 84 can move along the second axis 88 in opposite directions, and thus, the first and second end shafts 86, 90 can correspondingly move in opposite directions. It is to be appreciated that one or more bearings can rotatably support the first and second end shafts 86, 90 and/or the intermediate shaft 92. It is to also be appreciated that the intermediate shaft 92, and the first and second end shafts 86, 90 can cooperate with each other in any suitable configuration.

In certain embodiments, the first and second starter gears 40, 84 can move in tandem. Therefore, for example, the first starter gear 40 can move into engagement with the ring gear 30 before the second starter gear 84 moves into engagement with the first gear 78, and alternatively, the second starter gear 84 can move into engagement with the first gear 78 before the first starter gear 40 moves into engagement with the ring gear 30. In other embodiments, the first and second starter gears 40, 84 can move simultaneously into engagement with the ring gear 30 and the first gear 78 respectively.

In the configuration of FIG. 2, the motor-generator 42 is activated or energized to rotate the motor/generator shaft 50. Furthermore, the starter mechanism 38 can be activated or energized to move the first and second starter gears 40, 84 into engagement with the ring gear 30 and the first gear 78 respectively. Therefore, rotation of the motor/generator shaft 50 drives the rotation of the first and second starter gears 40, 84 which rotate the ring gear 30 and the crankshaft 22 to start the engine 14. Specifically, when the motor-generator 42 is actuated to start the engine 14, the first and second starter gears 40, 84 move into engagement with the ring gear 30 and the first gear 78 respectively, which thus provides concurrent rotation of the first and second end shafts 86, 90, the first and second starter gears 40, 84, the motor/generator shaft 50, the first shaft 80 and the first gear 78 to rotate the ring gear 30 and the crankshaft 22 to start the engine 14. Therefore, to start the engine, torque is transferred from the rotation of the motor/generator shaft 50 to the crankshaft 22 through the adapter 48, the first and second end shafts 86, 90, the first and second starter gears 40, 84 and the ring gear 30. When the starter mechanism 38 is de-energized, the first and second starter gears 40, 84 disengage the ring gear 30 and the first gear 78 respectively, i.e., torque is not transferred to the crankshaft 22 through the starter mechanism 38.

The starter mechanism 38 of FIGS. 2 and 6, can include a linear actuator 94 that can be selectively energized to move the first and/or second starter gears 40, 84 back and forth into selective engagement with the ring gear 30 and the first gear 78 respectively. It is to be appreciated that more than one linear actuator 94 can be utilized as shown in FIG. 6. The linear actuator 94 can be various configurations, and non-limiting examples can include a solenoid (as shown in FIG. 6), an electric motor driving a ball-screw mechanism, a shape-memory alloy actuator, an electro-active polymer actuator, etc. For the shape-memory alloy actuator, selectively energizing the material, such as the alloy, can change the shape of the material which causes the first and/or second starter gears 40, 84 to move back and forth. For the electro-active polymer actuator, selectively energizing the material, such as the polymer, can change the shape of the material to move the first and/or second starter gears 40, 84 back and forth. It is to be appreciated that the starter mechanism 38 can include at least one return mechanism 96 (see FIG. 6) to move the first and/or second starter gears 40, 84 out of engagement with the ring gear 30 and the first gear 78.

The operation of the linear actuator 94 is detailed below utilizing the solenoid example as shown in FIG. 6. Generally, one solenoid can be utilized to move the first starter gear 40 along the second axis 88 and another solenoid can be utilized to move the first starter gear 40 along the second axis 88. The solenoid can be disposed inside, partially inside or outside the starter mechanism 38, or be in any other suitable location.

As shown in FIG. 6, each solenoid can include a coil 98 selectively magnetized and a core 100 attracted to the coil 98 when the coil 98 is magnetized. One core 100 is coupled to the first starter gear 40 and is selectively attracted to the corresponding coil 98, and another core 100 is coupled to the second starter gear 84 and is selectively attracted to the corresponding coil 98. When the core 100 is attracted to the corresponding coil 98 for the first starter gear 40, the first starter gear 40 can move into engagement with the ring gear 30, and the same occurs with the core 100 and coil 98 for the second starter gear 84. It is to be appreciated that the solenoid can be other configurations than discussed above. For example, the coil 98 can be concentric or eccentric about the second axis 88, or the coil 98 can be disposed at one side. The core 100 can be formed of a ferromagnetic material or any other suitable material that can be attracted to the coil 98 when the coil 98 is magnetized.

Turning to FIG. 3, the motor-generator 42 provides the motor that rotates the first starter gear 40 to rotate the ring gear 30 and the crankshaft 22 to start the engine 14. In this embodiment, the starter mechanism 38 is further defined as a starter clutch 102 coupleable to the motor-generator 42 through the adapter 48 when in the first assembly configuration to selectively transfer torque from the motor-generator 42 through the adapter 48 and the starter mechanism 38 to the crankshaft 22 to start the engine 14. More specifically, the starter clutch 102 is coupleable to the first coupling portion 60 of the adapter 48 when in the first assembly configuration to selectively connect rotation between the motor/generator shaft 50 and the first starter gear 40 of the starter mechanism 38 to selectively transfer torque to the crankshaft 22 to start the engine 14. Therefore, the motor/generator shaft 50 is selectively coupled to the first starter gear 40 through operation of the starter clutch 102.

The starter clutch 102 can include a solenoid 104 to selectively actuate the starter clutch 102. The starter clutch 102 can have one or more coupling shafts 106 coupled thereto to selectively transfer rotational movement of the motor/generator shaft 50 to the first starter gear 40. For example, the starter clutch 102 can be disposed between a pair of coupling shafts 106, with one coupling shaft 106 attached to the first coupling portion 60 of the adapter 48 and the first starter gear 40 attached to another coupling shaft 106. Therefore, the starter mechanism 38 and the motor-generator 42 are coupleable to each other through, for example, selectively connecting rotation of the motor/generator shaft 50 and the coupling shafts 106. In this embodiment, the coupling shafts 106 and the motor/generator shaft 50 align with each other. In other words, the first and second axes 56, 88 are coaxial. It is to be appreciated that the starter clutch 102 can be a one-way clutch or any other suitable type of clutch.

In the configuration of FIG. 3, the motor-generator 42 is activated or energized to rotate the motor/generator shaft 50. Furthermore, the starter clutch 102 can be activated or energized to connect rotation of the motor/generator shaft 50 with the first starter gear 40. Therefore, rotation of the motor/generator shaft 50 drives the rotation of the first starter gear 40 to rotate the ring gear 30 and the crankshaft 22 to start the engine 14, i.e., transfer torque. When the starter clutch 102 is de-energized, rotation between the motor/generator shaft 50 and the first starter gear 40 is disconnected, i.e., torque is not transferred. In this embodiment, the first starter gear 40 can remain in engagement with the ring gear 30 when the starter clutch 102 is either energized or de-energized. In other words, the first starter gear 40 remains in continuous engagement with the ring gear 30. As such, the first starter gear 40 does not move back and forth into and out of engagement with the ring gear 30. Said differently, the first starter gear 40 and the ring gear 30 remain meshed together.

The motor-generator 42 and the starter mechanism 38 can be coupleable to each other in other configurations than discussed above. For example, another suitable configuration of the starter mechanism 38 can be a single shaft having the first starter gear 40 attached to one end and the second starter gear 84 attached to another end. In other words, the two separate shafts 86, 90 (as discussed above) are eliminated and a single shaft is utilized, and in this configuration, one linear actuator 94 can be utilized. In another suitable configuration of the starter mechanism 38, the second starter gear 84 can remain in engagement with the first gear 78 while only the first starter gear 40 is able to move back and forth into and out of engagement with the ring gear 30; and in this embodiment, one linear actuator 94 can be utilized. Yet another suitable configuration of the starter mechanism 38 is that the second starter gear 84 is eliminated and only the first starter gear 40 is utilized, with the first starter gear 40 movable to engage and disengage from both the first gear 78 and the ring gear 30; and in this configuration, one linear actuator 94 can be utilized. In yet another configuration of the starter mechanism 38, the first gear 78, the second end shaft 90 and the second starter gear 84 are eliminated, with the first end shaft 86 of the starter mechanism 38 and the first shaft 80 being concentric with each other, and the first starter gear 40 movable along the first shaft 80 to engage and disengage the ring gear 30.

Furthermore, as shown in FIGS. 2 and 3, the motor-generator 42 and the starter mechanism 38 are coupleable to each other, such as by shaft(s)/gear(s)/clutch(es), to allow the motor-generator 42 to have different ratios for starting and restarting the engine 14, which utilizes the gears, as compared to generating and torque assist, which utilizes the pulleys. For example, the during starting of the engine 14, the ratio between the motor/generator shaft 50 and the crankshaft 22 can be 5:1 or higher, while the ratio between the motor/generator shaft 50 and the crankshaft 22 during generating electricity after the engine 14 has been started can be 4:1 or lower (such as 3:1, etc.).

Turning to the second assembly configuration as shown in FIG. 4, the motor-generator 42 and the starter mechanism 38 operate independently of each other. In other words, the starter mechanism 38 can rotate the first starter gear 40 without assistance from the motor-generator 42. As such, the motor-generator 42 and the starter mechanism 38 are not coupleable to each other. Therefore, the starter mechanism 38 operates independently of the motor-generator 42 when in the second assembly configuration to selectively start the engine 14.

Specifically, the starter mechanism 38 can include a motor 108 (see FIG. 4) when in the second assembly configuration. The motor 108 of the starter mechanism 38 operates independently of the motor-generator 42 such that the motor 108 of the starter mechanism 38 selectively transfers torque to the crankshaft 22 to start the engine 14. Furthermore, the motor 108 of the starter mechanism 38 is spaced from the adapter 48, and more specifically spaced from the first coupling portion 60 of the adapter 48. In other words, the motor 108 of the starter mechanism 38 is not coupled to the adapter 48. The motor 108 of the starter mechanism 38 is coupled to the first starter gear 40 to selectively rotate the first starter gear 40. Specifically, the starter mechanism 38 can include a starter shaft 110 coupled to the motor 108, with the first starter gear 40 attached to the starter shaft 110. The first starter gear 40 and the starter shaft 110 can be rotatable in unison about the second axis 88 and can be movable along the second axis 88, i.e., move back and forth, into and out of engagement with the ring gear 30. The first starter gear 40 is shown engaging the ring gear 30 in solid lines in FIG. 4 and the first starter gear 40 is shown disengaged from the ring gear 30 in phantom lines in FIG. 4. The motor-generator 42 and the starter mechanism 38 can be in any suitable location in the embodiment of FIG. 4 due to these devices being operable independently of each other, and therefore, the first and second axes 56, 88 can be coaxial or the first and second axes 56, 88 can be offset from each other.

The motor 108 of the starter mechanism 38 is activated or energized to rotate the starter shaft 110 and thus the first starter gear 40. Furthermore, the starter mechanism 38 can be activated or energized to move the first starter gear 40 into engagement with the ring gear 30. Therefore, rotation of the starter shaft 110 drives the rotation of the first starter gear 40 to rotate the ring gear 30 and the crankshaft 22 to start the engine 14, i.e., transfers torque. When the starter mechanism 38 is de-energized, the first starter gear 40 disengages the ring gear 30, i.e., torque is not transferred. Additionally, when the motor 108 of the starter mechanism 38 is de-activated, the motor 108 stops rotating the starter shaft 110. In this embodiment, the linear actuator 94 can be utilized to move the first starter gear 40 into and out of engagement with the ring gear 30.

The powertrain 10 for each of the embodiments discussed above can further include a controller 112, which can be part of an electronic control module that is in communication with various components of the vehicle 12. Generally, the controller 112 signals various components of the vehicle 12 to selectively operate, some of which are discussed below. It is to be appreciated that more than one controller 112 can also be utilized.

The controller 112 includes a processor 114 and a memory 116 on which is recorded instructions for communicating with the motor-generator 42, the starter mechanism 38, the energy storage device 46, etc. The controller 112 is configured to execute the instructions from the memory 116, via the processor 114. For example, the controller 112 can be a host machine or distributed system, e.g., a computer such as a digital computer or microcomputer, acting as a vehicle control module having a processor, and, as the memory 116, tangible, non-transitory computer-readable memory such as read-only memory (ROM) or flash memory. The controller 112 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 112 can include all software, hardware, memory 116, algorithms, connections, sensors, etc., necessary to monitor and control the motor-generator 42, the starter mechanism 38, the energy storage device 46, etc. As such, a control method can be embodied as software or firmware associated with the controller 112. It is to be appreciated that the controller 112 can also include any device capable of analyzing data from various sensors, comparing data, making the necessary decisions required to control and monitor the motor-generator 42, the starter mechanism 38, the energy storage device 46, etc.

The controller 112 is in communication with the motor-generator 42, the starter mechanism 38, the energy storage device 46 to selectively operate the motor-generator 42, the starter mechanism 38, the energy storage device 46, etc. The controller 112 can signal the motor-generator 42 to operate as the motor or as the generator. In certain embodiments, the controller 112 can signal the starter mechanism 38 to energize or de-energize the linear actuator(s) 94. In other embodiments, the controller 112 can signal the solenoid 104 of the starter clutch 102 to energize or de-energize. Furthermore, the controller 112 can signal the sensor 72 disposed about the motor/generator shaft 50 to detect the position of the motor/generator shaft 50 during rotation of the motor/generator shaft 50. Generally, the sensor 72 provides the controller 112 with data about the position of the motor/generator shaft 50.

The adapter 48 provides a universal end, compatible with certain starter mechanisms 38 when desired. Therefore, the motor-generator 42 can be utilized in different vehicle applications, i.e., motor-generator 42 used as the motor for the starter mechanism 38 or the motor-generator 42 used separately from the starter mechanism 38 (starter mechanism 38 has its own motor 108 independent of the motor-generator 42). Simply stated, the substantially the same motor-generator 42 can be utilized in both the first and second assembly configurations, while different starter mechanisms 38 are utilized in the first and second assembly configurations. As examples, when in the second assembly configuration, a four-cylinder inline engine can be utilized, and when in the first assembly configuration, a three-cylinder engine can be utilized where less space is available for components. The motor-generator 42 is designed to have substantially the same internal components, i.e., common hardware, when used in both the first and second assembly configurations which provides a universal motor-generator 42.

Referring to FIG. 8, the present disclosure also provides a method 1000 of assembling the powertrain 10. The method 1000 includes providing 1002 the engine 14 including the crankshaft 22 and attaching 1004 the ring gear 30 to the first distal end 32 of the crankshaft 22. The method 1000 also includes coupling 1006 the motor-generator 42 to the engine 14, with the motor-generator 42 including the adapter 48. The method 1000 further includes providing 1008 the starter mechanism 38 being selectively operable to rotate the ring gear 30 and the crankshaft 22 to start the engine 14. Additionally, the method 1000 includes assembling 1010 the motor-generator 42 and the starter mechanism 38 in the first assembly configuration when the starter mechanism 38 is coupleable to the adapter 48 to selectively transfer torque from the motor-generator 42 through the adapter 48 and the starter mechanism 38 to the crankshaft 22 to start the engine 14 and the second assembly configuration when the starter mechanism 38 is spaced from the adapter 48 to operate independently of the motor-generator 42 such that the starter mechanism 38 selectively transfers torque to the crankshaft 22 to start the engine 14.

To assemble the motor-generator 42 and the starter mechanism 38 in the first assembly configuration, one or more parts cooperate with the adapter 48. For the first assembly configuration illustrated in FIGS. 2 and 6, generally, the motor-generator 42 and the starter mechanism 38 are each coupled to the engine 14 and coupleable to each other through selective engagement of gears. It is to be appreciated that the motor-generator 42 and the starter mechanism 38 can be coupleable to each other through shafts and/or gears. Furthermore, for this configuration, the second coupling portion 82 of the first shaft 80 is attached to the first coupling portion 60 of the adapter 48, and therefore, the motor/generator shaft 50, the first gear 78 and the first shaft 80 can selectively rotate in unison. The starter mechanism 38 for this embodiment has the linear actuators 94 and does not have a separate motor. The linear actuators 94 selectively energized to move the first and second starter gears 40, 84 into engagement with the ring gear 30 and the first gear 78 respectively. The motor-generator 42 functions as the motor to selectively rotate the gears 30, 40, 78, 84 that start the engine 14.

For the first assembly configuration illustrated in FIG. 3, generally, the motor-generator 42 and the starter mechanism 38 are each coupled to the engine 14 and coupleable to each other through the starter clutch 102. For this configuration, the starter clutch 102 is coupled to the first coupling portion 60 of the adapter 48. In certain embodiments, one of the coupling shafts 106 is attached to the first coupling portion 60 and the first starter gear 40 is attached to another one of the coupling shafts 106. Therefore, when the starter clutch 102 is actuated, the motor/generator shaft 50, one or more coupling shafts 106 and the first starter gear 40 can rotate in unison. The starter mechanism 38 for this embodiment does not have a separate motor. The motor-generator 42 functions as the motor to selectively rotate the first starter gear 40 that starts the engine 14.

To assemble the motor-generator 42 and the starter mechanism 38 in the second assembly configuration, no parts from the starter mechanism 38 cooperate with the adapter 48. For the second configuration illustrated in FIG. 4, generally, the motor-generator 42 and the starter mechanism 38 are each coupled to the engine 14 and are not coupled to each other. In other word, the motor-generator 42 and the starter mechanism 38 are separate components that operate independently of each other. As such, the starter mechanism 38 includes the motor 108 discussed above to selectively start the engine 14. Therefore, the adapter 48 of the motor-generator 42 is not being utilized in this configuration.

It is to be appreciated that the order or sequence of performing the method 1000 as identified in the flowchart of FIG. 8 is for illustrative purposes and other orders or sequences are within the scope of the present teachings. It is to also be appreciated that the method 1000 can include other features not specifically identified in the flowchart of FIG. 8.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A powertrain for a vehicle, the powertrain comprising:
   an engine including a crankshaft being rotatable about a longitudinal axis;
   a ring gear attached to a first distal end of the crankshaft such that the ring gear and the crankshaft are rotatable in unison about the longitudinal axis;
   a starter mechanism selectively operable to rotate the ring gear and the crankshaft to start the engine; and
   a motor-generator including an adapter selectively cooperating with the starter mechanism to dispose the motor-generator and the starter mechanism in alternative assembly configurations being a first assembly configuration and a second assembly configuration, with the first assembly configuration being when the starter mechanism is coupleable to the adapter to selectively transfer torque from the motor-generator through the adapter and the starter mechanism to the crankshaft to start the engine, and the second assembly configuration being when the starter mechanism is spaced from the adapter to operate independently of the motor-generator such that the starter mechanism selectively transfers torque to the crankshaft to start the engine.

2. A powertrain as set forth in claim 1 wherein the motor-generator includes a motor/generator shaft selectively rotatable about a first axis, with the adapter coupled to the motor/generator shaft.

3. A powertrain as set forth in claim 2 wherein the motor-generator includes a sensor disposed about the motor/generator shaft to detect a position of the motor/generator shaft during rotation of the motor/generator shaft.

4. A powertrain as set forth in claim 2 wherein the adapter is disposed at a distal end of the motor/generator shaft, with the adapter including a first coupling portion.

5. A powertrain as set forth in claim 4 wherein the first coupling portion is splined.

6. A powertrain as set forth in claim 4 further including a first gear coupled to the first coupling portion of the adapter when in the first assembly configuration.

7. A powertrain as set forth in claim 6 further including a first shaft having the first gear attached to the first shaft, with the first shaft attached to the first coupling portion when in the first assembly configuration such that the first shaft, the first gear and the motor/generator shaft are rotatable in unison.

8. A powertrain as set forth in claim 7 wherein the first shaft includes a second coupling portion engaging the first coupling portion of the adapter when in the first assembly configuration, with the first gear spaced from the second coupling portion.

9. A powertrain as set forth in claim 6 wherein the starter mechanism includes a first starter gear being engagable with the ring gear to selectively rotate the ring gear and the crankshaft to start the engine, and wherein the starter mechanism includes a second starter gear coupleable to the first gear when in the first assembly configuration.

10. A powertrain as set forth in claim 9 wherein the first starter gear is movable to selectively engage the ring gear, and the second starter gear is movable to selectively engage the first gear, and when the first starter gear engages the ring gear and the second starter gear engages the first gear, the motor/generator shaft, the first gear, the first and second starter gears and the ring gear rotate concurrently with each other to transfer torque from the motor/generator shaft through the adapter, the first and second starter gears and the ring gear to the crankshaft to start the engine.

11. A powertrain as set forth in claim 4 wherein the starter mechanism is further defined as a starter clutch coupleable to the first coupling portion of the adapter when in the first assembly configuration to selectively connect rotation between the motor/generator shaft and the starter mechanism to selectively transfer torque to the crankshaft to start the engine.

12. A powertrain as set forth in claim 1 wherein the starter mechanism includes a motor when in the second assembly configuration and operates independently of the motor-generator such that the motor of the starter mechanism selectively transfers torque to the crankshaft to start the engine, with the motor spaced from the adapter, and the motor of the starter mechanism being coupled to the first starter gear to selectively rotate the first starter gear.

13. A powertrain as set forth in claim 12 wherein the starter mechanism includes a first starter gear being engagable with the ring gear to selectively rotate the ring gear and the crankshaft to start the engine.

14. A powertrain as set forth in claim 1 wherein the motor-generator and the starter mechanism are selectively geared to each other through the adapter when in the first assembly configuration to selectively start the engine.

15. A powertrain as set forth in claim 1 wherein the starter mechanism operates independently of the motor-generator when in the second assembly configuration to selectively start the engine.

16. A powertrain as set forth in claim 1 wherein the starter mechanism is further defined as a starter clutch coupleable to the motor-generator through the adapter when in the first assembly configuration to selectively transfer torque from the motor-generator through the adapter and the starter mechanism to the crankshaft to start the engine.

17. A powertrain as set forth in claim 1:
wherein the motor-generator includes a motor/generator shaft and a motor/generator pulley coupleable to the motor/generator shaft, with the motor/generator pulley being disposed adjacent to a first end of the motor-generator and being rotatable about a first axis;
wherein the adapter is disposed adjacent to a second end of the motor-generator;
further including a crankshaft pulley coupleable to a second distal end of the crankshaft such that the crankshaft pulley and the crankshaft are rotatable in unison about the longitudinal axis; and
further including an endless rotatable device disposed about the crankshaft pulley and the motor/generator pulley to selectively transfer rotational movement between the crankshaft pulley and the motor/generator pulley.

18. A powertrain for a vehicle, the powertrain comprising:
an engine including a housing and a crankshaft at least partially disposed inside the housing, with the crankshaft being rotatable about a longitudinal axis;
a ring gear disposed outside of the housing and attached to a first distal end of the crankshaft such that the ring gear and the crankshaft are rotatable in unison about the longitudinal axis;
a starter mechanism selectively operable to rotate the ring gear and the crankshaft to start the engine; and
a motor-generator including an adapter selectively cooperating with the starter mechanism to dispose the motor-generator and the starter mechanism in alternative assembly configurations being a first assembly configuration and a second assembly configuration, with the first assembly configuration being when the starter mechanism is coupleable to the adapter to selectively transfer torque from the motor-generator through the adapter and the starter mechanism to the crankshaft to start the engine, and the second assembly configuration being when the starter mechanism is spaced from the adapter to operate independently of the motor-generator such that the starter mechanism selectively transfers torque to the crankshaft to start the engine.

19. A powertrain as set forth in claim 18 wherein the motor-generator includes a motor/generator shaft selectively rotatable about a first axis, with the adapter coupled to the motor/generator shaft and wherein the motor-generator includes a sensor disposed about the motor/generator shaft to detect a position of the motor/generator shaft during rotation of the motor/generator shaft.

20. A method of assembling a powertrain, the method comprising:
providing an engine including a crankshaft;
attaching a ring gear to a first distal end of the crankshaft;
coupling a motor-generator to the engine, with the motor-generator including an adapter;
providing a starter mechanism being selectively operable to rotate the ring gear and the crankshaft to start the engine; and
assembling the motor-generator and the starter mechanism in a first assembly configuration when the starter mechanism is coupleable to the adapter to selectively transfer torque from the motor-generator through the adapter and the starter mechanism to the crankshaft to start the engine and a second assembly configuration when the starter mechanism is spaced from the adapter to operate independently of the motor-generator such that the starter mechanism selectively transfers torque to the crankshaft to start the engine.

* * * * *